US012680888B2

(12) United States Patent
Folkmer et al.

(10) Patent No.: US 12,680,888 B2
(45) Date of Patent: Jul. 14, 2026

(54) DEVICE FOR MEASURING DEFORMATIONS, STRESSES, FORCES AND/OR TORQUES IN A PLURALITY OF AXES WITH A SENSOR CHIP ATTACHED TO A REAR SIDE OF A BASE PLATE BELOW A FORCE CONDUCTOR

(71) Applicant: HAHN-SCHICKARD-GESELLSCHAFT FÜR ANGEWANDTE FORSCHUNG E. V., Villingen-Schwenningen (DE)

(72) Inventors: Bernd Folkmer, Constance (DE); Thorsten Hehn, Reute (DE); Manuel Koehler, Buchenbach (DE)

(73) Assignee: HAHN-SCHICKARD-GESELLSCHAFT FÜR ANGEWANDTE FORSCHUNG E. V., Villingen-Schwenningen (DE)

( * ) Notice: Subject to any disclaimer, the term of this patent is extended or adjusted under 35 U.S.C. 154(b) by 335 days.

(21) Appl. No.: 18/548,528

(22) PCT Filed: Mar. 1, 2022

(86) PCT No.: PCT/EP2022/055098
§ 371 (c)(1),
(2) Date: Aug. 31, 2023

(87) PCT Pub. No.: WO2022/184690
PCT Pub. Date: Sep. 9, 2022

(65) Prior Publication Data
US 2024/0167896 A1     May 23, 2024

(30) Foreign Application Priority Data
Mar. 1, 2021     (EP) .................................... 21159920

(51) Int. Cl.
*G01L 1/04*     (2006.01)
*G01L 1/18*     (2006.01)
*G01L 5/162*     (2020.01)

(52) U.S. Cl.
CPC .................. *G01L 1/04* (2013.01); *G01L 1/18* (2013.01); *G01L 5/162* (2013.01)

(58) Field of Classification Search
CPC ....... G01L 5/223; G01L 5/1623; G01L 5/162; G01L 1/2237; G01L 1/22; G01L 1/18
See application file for complete search history.

(56) References Cited

U.S. PATENT DOCUMENTS 4,146,864 A * 3/1979 Bethe .................... G01L 1/2231
                                                    73/862.633
4,709,342 A * 11/1987 Hosoda ................... G01L 5/228
                                                    901/33

(Continued)

FOREIGN PATENT DOCUMENTS

EP          3722765 A1     10/2020
WO     WO 03/087750 A1     10/2003

OTHER PUBLICATIONS

International Search Report received in International Application No., PCT/EP2022/055098, mailed on Jun. 13, 2022.

*Primary Examiner* — Tran M. Tran
(74) *Attorney, Agent, or Firm* — Knobbe, Martens, Olson & Bear, LLP

(57) ABSTRACT

An apparatus for measuring deformations, stresses, forces and/or torques of an object includes a spring body and a sensor chip, which includes one or more sensor elements for measuring a deformation, stress, force and/or a torque as well as an electronic circuit on a substrate. The spring body includes a base plate on the front side of which a force conductor, preferably in the form of a pin, is installed, the sensor chip being positioned on the rear side of the base (Continued)

plate below the force conductor. Also disclosed a system including the apparatus and a data processing unit, wherein the data processing unit is configured for reading out measured data detected by the sensor chip and preferably detects the forces and/or torques acting on the force conductor based thereon.

18 Claims, 5 Drawing Sheets

(56) References Cited

U.S. PATENT DOCUMENTS

| | | | | |
|---|---|---|---|---|
| 4,719,538 | A * | 1/1988 | Cox | G01D 5/2417 |
| | | | | 361/283.2 |
| 4,747,313 | A * | 5/1988 | Okada | G01L 5/162 |
| | | | | 73/862.043 |
| 5,024,107 | A * | 6/1991 | Bethe | G01L 1/2231 |
| | | | | 73/862.622 |
| 5,117,687 | A * | 6/1992 | Gerardi | G01L 5/223 |
| | | | | 73/170.15 |
| 5,311,779 | A * | 5/1994 | Teruo | G01L 5/223 |
| | | | | 73/753 |
| 5,510,812 | A * | 4/1996 | O'Mara | G06F 3/0338 |
| | | | | 345/161 |
| 5,526,700 | A * | 6/1996 | Akeel | G01L 1/18 |
| | | | | 73/862.042 |
| 5,754,167 | A * | 5/1998 | Narusawa | G05G 9/047 |
| | | | | 345/161 |
| 5,801,339 | A * | 9/1998 | Boult | G01G 21/06 |
| | | | | 177/261 |
| 5,835,977 | A * | 11/1998 | Kamentser | G01L 5/223 |
| | | | | 73/862.05 |
| 5,867,808 | A | 2/1999 | Selker et al. | |
| 5,872,320 | A * | 2/1999 | Kamentser | G01L 5/163 |
| | | | | 73/862.044 |
| 5,889,507 | A * | 3/1999 | Engle | G05G 9/047 |
| | | | | 345/161 |
| 6,121,954 | A * | 9/2000 | Seffernick | G05G 9/047 |
| | | | | 345/161 |
| 6,304,247 | B1 * | 10/2001 | Black | G06F 3/0338 |
| | | | | 345/157 |
| 6,344,791 | B1 * | 2/2002 | Armstrong | G05G 9/04737 |
| | | | | 338/114 |
| 6,351,205 | B1 * | 2/2002 | Armstrong | H01C 10/106 |
| | | | | 338/114 |
| 6,360,622 | B1 * | 3/2002 | Shibata | G01L 5/223 |
| | | | | 345/161 |
| 6,417,466 | B2 * | 7/2002 | Gross | G01G 3/12 |
| | | | | 73/862.632 |
| 6,477,904 | B2 * | 11/2002 | Maeda | G01L 5/223 |
| | | | | 73/862.044 |
| 6,518,954 | B1 * | 2/2003 | Chen | G06F 3/0338 |
| | | | | 345/157 |
| 6,563,415 | B2 * | 5/2003 | Armstrong | H01H 13/785 |
| | | | | 338/114 |
| 7,040,182 | B2 * | 5/2006 | Teraoka | G01L 1/2231 |
| | | | | 73/862.627 |
| 7,343,223 | B2 * | 3/2008 | Miura | G01L 1/26 |
| | | | | 901/34 |
| 7,380,475 | B2 * | 6/2008 | Selig | B60R 21/01516 |
| | | | | 73/862.626 |
| 7,476,952 | B2 * | 1/2009 | Vaganov | G06F 3/0338 |
| | | | | 257/730 |
| 7,554,167 | B2 * | 6/2009 | Vaganov | G06F 3/0338 |
| | | | | 257/730 |
| 7,633,131 | B1 * | 12/2009 | Padmanabhan | B81C 1/00158 |
| | | | | 257/E21.154 |
| 7,870,796 | B2 * | 1/2011 | Hayakawa | G01L 1/20 |
| | | | | 73/862.046 |
| 8,004,052 | B2 * | 8/2011 | Vaganov | G06F 3/0338 |
| | | | | 257/730 |
| 8,053,267 | B2 * | 11/2011 | Vaganov | G01L 1/044 |
| | | | | 257/E21.001 |
| 8,113,065 | B2 * | 2/2012 | Ohsato | G01L 1/18 |
| | | | | 29/610.1 |
| 8,220,343 | B2 * | 7/2012 | Hatanaka | G01L 5/223 |
| | | | | 73/862.632 |
| 8,256,306 | B1 * | 9/2012 | Bauer | G01L 1/2231 |
| | | | | 73/862.474 |
| 8,350,345 | B2 * | 1/2013 | Vaganov | G06F 3/0338 |
| | | | | 257/419 |
| 8,648,267 | B2 * | 2/2014 | Honda | G01G 21/244 |
| | | | | 177/DIG. 9 |
| 8,661,916 | B2 * | 3/2014 | Hose von Wolfframsdorff | G01G 3/14 |
| | | | | 73/862.045 |
| 9,134,187 | B1 * | 9/2015 | Organ | G05G 9/047 |
| 9,182,302 | B2 * | 11/2015 | Lim | G01L 1/18 |
| 9,383,271 | B2 * | 7/2016 | Ojima | G01L 5/1627 |
| 9,442,027 | B1 * | 9/2016 | Eilersen | G01L 1/2243 |
| 9,518,882 | B2 * | 12/2016 | McNeilly | G01L 5/223 |
| 10,345,161 | B2 * | 7/2019 | Caltabiano | G01L 1/18 |
| 10,488,284 | B2 * | 11/2019 | Jentoft | G01L 1/02 |
| 10,627,918 | B2 * | 4/2020 | Fukumoto | G06F 3/03547 |
| 10,996,122 | B2 * | 5/2021 | Fritsch | G01L 1/122 |
| 11,042,179 | B1 * | 6/2021 | Muranaka | G05G 5/005 |
| 11,079,294 | B2 * | 8/2021 | Kageyama | G01B 7/00 |
| 11,137,311 | B2 * | 10/2021 | Di Leo | G01L 19/0618 |
| 11,156,511 | B2 * | 10/2021 | Wade | G01L 5/0033 |
| 11,169,624 | B2 * | 11/2021 | Mishalov | G06F 3/0383 |
| 11,221,640 | B2 * | 1/2022 | Muranaka | G05G 5/05 |
| 11,573,136 | B2 * | 2/2023 | Speldrich | G01L 1/18 |
| 11,680,860 | B2 * | 6/2023 | Pounds | B64U 30/20 |
| | | | | 73/862.043 |
| 11,747,220 | B2 * | 9/2023 | Stockton | G01L 5/1627 |
| | | | | 73/795 |
| 11,815,412 | B2 * | 11/2023 | Kadokura | G01L 1/2237 |
| 2002/0158840 | A1 * | 10/2002 | Hirano | H05K 1/0271 |
| | | | | 345/160 |
| 2002/0158841 | A1 * | 10/2002 | Hirano | G06F 3/0338 |
| | | | | 345/160 |
| 2007/0008281 | A1 * | 1/2007 | Yajima | G01L 5/223 |
| | | | | 345/156 |
| 2008/0178688 | A1 * | 7/2008 | Hirabayashi | G01L 5/162 |
| | | | | 73/862.041 |

* cited by examiner a

3

1

5

0,000    15,000    30,000(mm)
7,500    22,500 b

3

1

5

0,000    5,000    10,000(mm)
2,500    7,500 c

StrainSens SB.14
with spring body
and secondary coil

1

Base station

Primary coil
Reader coil

Mobile
visualization

Bluetooth
connection

Readout electronics
Data processing

Battery

USB:
Charging & GUI

DEVICE FOR MEASURING DEFORMATIONS, STRESSES, FORCES AND/OR TORQUES IN A PLURALITY OF AXES WITH A SENSOR CHIP ATTACHED TO A REAR SIDE OF A BASE PLATE BELOW A FORCE CONDUCTOR

The invention preferably relates to an apparatus for measuring multi-axis loads on an object comprising a spring body and a sensor chip, which has one or more sensor elements for measuring a deformation, stress, force and/or torque, as well as an electronic circuit on a substrate. The spring body comprises a base plate on the front side of which a force conductor is installed, preferably in the form of a pin, the sensor chip being positioned on the rear side of the base plate below the force conductor. The invention further relates to a system comprising such an apparatus as well as a data processing unit, wherein the data processing unit is configured for reading out the measured data detected by the sensor chip and based thereon preferably calculates the forces and/or torques acting on the force conductor.

BACKGROUND AND PRIOR ART

The invention relates to the field of sensors for measuring deformations, stresses, forces and/or torques.

Force measurements on objects are carried out, for example, for the purpose of dimensioning and checking mechanically stressed components. When dimensioning mechanically stressed components in accordance with their function, it is necessary to know the nature of the loads. The decisive variables for the design are the maximum stresses that occur, which ultimately define the dimensions. These stresses must be identified in advance and then verified experimentally in tests. An experimental stress analysis can thus be regarded as a link between the theoretical calculations and the verifications in the test.

It is also necessary to measure forces and/or deformations for monitoring the condition of machines in order to identify and document variable loads. These can occur, for example, due to temporal changes in boundary and operating conditions as well as material properties.

A particularly compact dimensioning of the force sensors is desirable in order to exclude influences on the machines or components to be monitored. Furthermore, compact dimensioning of the force sensors is desirable in order to resolve local (possibly multi-axis) deformation or stress/strain conditions. Depending on the local distribution of the deformation or stress gradients, a large-area, non-compact transducer can disadvantageously only roughly identify average local conditions.

The size of known force sensors is usually determined by the dimensioning of spring bodies or load cells, as well as the minimum dimensions of the transducers.

The spring body or the load cell is usually a suitably shaped piece of metal that serves to transmit the force and whose geometry changes slightly under the influence of the forces or torques. The resulting deformation is detected by a transducer, for example a strain gauge or another resistive or capacitive measuring unit.

The overall dimension of the apparatus is determined in particular by the minimum dimension of the transducers. When determining multi-axis loads, multiple transducers are usually required—at least one transducer for each axis—which are arranged spatially separated at corresponding positions.

Placing multiple transducers, for example in the form of strain gauges, requires increased space.

Due to the component geometry and the load application, the load state is a function of location. The magnitudes of the principal stresses vary over the surface, as do their principal directions. If no additional normal load (e.g. pressure) is applied, a biaxial stress state is usually present in the case of multi-axis loads on surfaces of objects to be measured. As a rule, however, its principal directions are unknown.

Strain gauge rosettes, which have multiple strain gauges in various directions, perform the important task within experimental stress analysis of completely determining a biaxial stress/strain state, since it has been demonstrated that the principal strains can be detected with three independent strain measurements in differing directions. Even if the principal directions are known, two independent strain measurements are still needed to detect them. Known arrangements in the prior art are the 45° right-angle rosette and the 60° delta rosette.

Common spring bodies are designed with multiple zones for the respective uniaxial loads, which can be specifically measured by means of multiple transducers.

Typical spring body shapes for load cells include, for example, double bending beams for small loads, shear bars for larger loads, columnar spring bodies (compression bar or hollow cylinder, ring torsion spring bodies for high loads, multi-bending beam spring bodies for high-value scales, or diaphragm spring bodies, which have a small size with high rigidity.

The stress state is measured by means of a deformation or strain measurement. Even at high component loads (stress shortly before breaking point), only very small deformations or strains (approx. 1-2°/oo) are present in common, mostly metallic materials.

For particularly rigid systems, such as machine tools or linear measuring devices, the usable strain is significantly smaller. Semiconductor strain gauges that can be used for this purpose can usually only be applied with effort.

Strain gauges are basically based on the change in electrical resistance due to changes in length and cross-section. If a strain gauge is subject to strain, its resistance increases. If it is compressed (negative strain), its resistance $R$ decreases. Here, $dR/R=k\cdot\varepsilon$, where $\varepsilon$ corresponds to the relative change in length.

Problem areas of metallic strain gauges are low k-factors and resulting low sensitivities as well as large strain gauges and therefore poor spatial resolution, especially with rosettes, whereby both a poor spatial resolution and an error-prone result can occur due to the size of the strain gauges at the various locations on the different axes.

In contrast, semiconductor strain gauges allow much more sensitive measurements. However, the mechanical sensitivity of these strain gauges is also very high, the assembly is therefore complex and nevertheless breakage of the strain gauge often occurs. In addition, these semiconductor strain gauges are often adhered rigidly over the entire surface of the object to be measured, frequently also to increase the stability of the strain gauge. In this case, the mechanical properties of the adhesive often influence and falsify the strain measurement.

Also in general, problems often arise with the known strain gauge measurement methods, especially with the commonly used bridge circuits with only 1 or 2 active, relatively large strain gauges at different locations on the component and the addition of passive resistors to the bridge circuit; these problems include in particular poor temperature compensation and low sensitivities.

Silicon chip based sensors are also known in the prior art, having multiple sensor elements to measure stress distributions.

In Jaeger et al. 2000, stress measurements are disclosed which are based on the piezoresistive behavior of CMOS-integrated field effect sensors. The circuits provide temperature-compensated measurement results which are proportional to the normal differential stress $(\sigma_{xx}-\sigma_{yy})$ and the shear stress $(\sigma_{xy})$ in a plane. The use of silicon field-effect transistors as stress sensors offers a number of advantages over conventional resistive elements due to their small size, high sensitivity, and their integrability into active circuits and allows well-localized stress state measurements.

Gieschke et al. 2009 propose CMOS-integrated sensors using piezoresistive sensor bridges with analog and digital circuitry. On a sensor chip, 32 piezoresistive sensor bridges are distributed as sensor elements and allow the measurement of shear stress $(\sigma_{xy})$ or normal differential stress $(\sigma_{xx}-\sigma_{yy})$ in one plane. The sensor elements can be described as four transistors arranged in a square as Wheatstone bridges. The shear stress is detected by n-channel based transistors, where the sensor bridge is rotated by 45° to an (x,y)-coordinate system, while p-channel based transistors are arranged as a sensor bridge parallel to the coordinate system and measure the normal differential stress.

Kuhl et al. 2013 describe sensor chips based on the technology of Gieschke et al. 2009. The piezoresistive sensor bridges are configured as square field effect transistors (FET, preferably MOSFET) with four source/drain contacts (piezo FETs), which exploit the piezoresistive shear effect in n-type (NMOS) or p-type (PMOS) inversion layers. Preferably, NMOS sensor elements are used for measuring the shear stress $\sigma_{xy}$, and PMOS sensor elements are used for measuring the normal differential stress $(\sigma_{xx}-\sigma_{yy})$. On a sensor chip, 24 such piezoresistive sensor bridges are distributed as sensor elements. Ten NMOS-type sensor elements measure the shear stress and fourteen PMOS-type sensor elements measure the normal differential stress.

However, there is a need for improvement with regard to their use for measuring and/or monitoring multi-axis loads on components or objects.

OBJECTIVE OF THE INVENTION

The objective of the invention is to provide an apparatus without the disadvantages of the prior art. In particular, one objective of the invention was to provide an apparatus which can detect multi-axis stresses on objects with high precision and which is also characterized by a compact, robust structure with low susceptibility to error.

SUMMARY OF THE INVENTION

The objective is solved by the features of the independent claims. Advantageous embodiments of the invention are described in the dependent claims.

In one aspect, the invention preferably relates to an apparatus for measuring multi-axis loads on an object comprising a spring body and a sensor chip comprising one or more sensor elements for measuring a deformation, stress, force and/or torque as well as an electronic circuit on a substrate characterized in that the spring body comprises a base plate, on the front side of which a force conductor is installed, the sensor chip being positioned on the rear side of the base plate below the force conductor.

The spring body advantageously allows stresses, forces or strain from multi-axis loads or external loads to be concentrated in only one small spatial zone in the base plate. For example, the force conductor can be an oblong force pointer or pin, which is locally connected to the base plate at a fixing point.

A load exerted on the force conductor at the end further away from the base plate leads to a localized stress distribution at the fixing point and, given an appropriate configuration of the spring body, also at the rear side of the base plate, which advantageously correlates unambiguously in terms of magnitude (height) and direction with the load exerted on the force conductor.

Preferably, the maximum loads at the measuring point are of the same order of magnitude as at the front fixing point of the force conductor or pin, whereby undesirably high notch stresses at the pin fixing point are reduced. The stress distribution at the rear is preferably adapted to the sensor chip in terms of area and increased. Advantageously, it is thus possible to measure external loads or forces to be measured very sensitively, whereby there is no limitation due to a rigidity problem at the fixing point.

Advantageously, the sensor chip attached to the rear of the base plate allows precise, spatially resolved measurement of deformations, stresses, forces and/or torques in the relevant area of the base plate at the location of the chip. In this case, deformations, stresses or forces and torques acting on the base plate are preferably transmitted to the substrate of the sensor chip, whereby the one or more sensor elements detect deformations or stresses of the substrate. With appropriate calibration, the deformations or stresses of the substrate (which is connected to the rear of the base plate) can be used to draw extremely precise conclusions about the forces or torques acting on the force conductor.

The apparatus can be kept extremely rigid for this purpose, since even slight deflections or translations of the force conductor can be reliably measured in the form of characteristic deformations or stress distribution in the base plate.

The force conductor itself can be installed in an object, for example a component, an operating element or a machine, via a positive and/or frictional connection, such that multi-axis loads on the object are transferred directly to the force conductor.

Loads refer to mechanical loads and, for the purposes of the invention, preferably mean deformations, stresses, forces and/or torques acting on the respective components, such as the object, force conductor or base plate.

The loads may include, for example, deflection with respect to the force conductor, preferably a pin, for example due to lateral forces $(F_x, F_y)$, which preferably act on the end of the force conductor further away from the base plate. A (mechanical) stress is preferably indicated by the ratio of forces (for example lateral forces) on a chosen sectional area. A mechanical normal stress a exerted by an object on a chosen sectional area A is the component $F_n$ of an external force F acting perpendicularly on area A. The normal stress $\sigma_{xx}$ therefore preferably indicates the force along the x-axis $(F_x)$ acting in a chosen x,y coordinate system on a sectional area A of the sensor chip or substrate (yz plane) perpendicular to it.

The deflection of the force conductor, preferably the pin, causes a deformation of the base plate, in particular in the area where the force conductor is fixed, i.e. in an area where the force conductor is positively and/or frictionally connected to the base plate.

In the area of the base plate, for example, strains or compressions occur which are a function of the direction and amplitude of the deflection and allow conclusions to be drawn with regard to them.

A strain (often designated by the formula symbol ε) indicates a relative change in the length of an object, which can be an extension or shortening. An increase in the size of the object is referred to as a positive strain or expansion, otherwise it is referred to as a negative strain or compression. A strain is preferably defined as $\varepsilon = \Delta l / l_0$, where $\Delta l$ represents the change in length and $l_0$ represents the initial length.

Within the meaning of the invention, local expansions or contractions of the base plate in particular are detected by means of the sensor chip, which enables a precise determination of the deflections of the force conductor in multiple axes. The plane (xy-plane) preferably corresponds to the plane of the sensor chip on which the sensor elements are arranged and, for example, preferably measure a shear stress or normal differential stress.

If the force conductor is positively fitted into an object, for example a joystick or an axle, deformations or stresses in the object can be detected directly by measuring the smallest deflections.

Loads can also relate to axial forces ($F_z$) acting on the force conductor in its axial direction (in the case of a pin, its longitudinal direction). In the case of an axial tensile or compressive force on the force conductor, preferably in the form of a pin, characteristic deformations or stresses also occur within the fixing area of the base plate. For example, in the case of a round pin, the base plate can experience curvature due to an axial tensile or shear force on the force conductor, with a characteristic expansion or compression pattern.

Furthermore, torques ($M_z$) acting on the force conductor also advantageously cause specific deformations or stresses in the area of the base plate, for example in the form of a torsion pattern. By appropriately integrating the apparatus, in particular the force conductor, into a component, for example a tool spindle, torques or torsion patterns can be measured within the component or spindle.

The possible applications of the apparatus according to the invention are various, with the advantages of the proposed apparatus coming to bear in particular in the measurement or monitoring of multiaxial loads.

In addition, the apparatus is characterized by a compact structure, since preferably exactly one sensor chip is used, which measures the loads on the force conductor in a localized area of the base plate.

The apparatus is also particularly robust in handling due to media separation. While the spring body's force conductor is connected to the front of the object or component, the sensor chip is installed separately on the rear of the spring body. For example, due to its compact structure, precise measurement accuracy and media separation, the apparatus can be used as a miniaturized flow sensor, preferably according to the baffle plate or vortex principle or combinations thereof.

In addition, the apparatus according to the invention is particularly suitable for tactile control for Human Machine Interface (HMI) applications. A high degree of rigidity of the spring body is advantageous for this, whereby displacement-free controls with preferably low forces (e.g. 5-10 N) are precisely possible.

Integrated into a joystick, the apparatus can be used, for example, to operate machines, vehicles or wheelchairs. It is also possible to use the apparatus to provide a keyboard panel. Due to the highly sensitive measurement of an axial force in Z and of torques around X or Y, the location and magnitude of a force application on a panel with a connected force sensor can be measured in an extremely sensitive manner. The apparatus is also particularly suitable as a "sensing probe" in 3D coordinate metrology, whereby a significantly smaller or more compact and more cost-effective solution can be offered compared to the prior art.

Furthermore, the compact and robust design of the apparatus also allows a particularly advantageous use as a force sensor in soft/sensitive robotics. Here, force-based control can supplement or replace pure path control. This allows much more sensitive control, for example with regard to gripping movements or in the positioning of automatically guided elements, for example tools, in the event of counterforces. Advantageously, the apparatus according to the invention can therefore also be used, for example, in complex human-machine co-working or precision machining, for example metal-cutting machining.

Purely path-controlled robotic systems often lack the necessary sensitivity for such applications. Although path control can be extremely precise, without precise measurement of the acting forces, undesirable damage can easily occur to the objects being processed.

In a preferred embodiment, the spring body is configured in such a way that forces and/or torques acting on the force conductor are concentrated in a local area of the base plate, such that the sensor chip installed on the rear side below said area allows conclusions to be drawn about the forces and/or torques acting on the force conductor on the basis of a measurement of deformations, stresses, forces and/or torques of its substrate connected to the area of the base plate.

Particularly preferably, the force conductor is a pin (or also rod or pointer), which is arranged preferably force-free (without load) substantially perpendicular to the surface of the base plate.

The force conductor, in particular in the form of a pin, is preferably oblong with a small cross-sectional dimension compared to its length or height. The ratio of the cross-sectional dimension to the length or height is preferably referred to as the aspect ratio. The cross-sectional dimension preferably denotes the maximum extension in the cross-section of the force conductor. In the case of a circular cross-section, the cross-sectional dimension preferably corresponds to a diameter. In the case of a square cross-section, the cross-sectional dimension preferably corresponds to an edge length.

Terms such as substantially, approximately, about, etc. preferably describe a tolerance range of less than ±20%, preferably less than ±10%, even more preferably less than ±5% and in particular less than ±1%. Indications of substantially, approximately, about, etc. always also disclose and comprise the exact value mentioned.

In a preferred embodiment, the force conductor, preferably in the form of a pin, has a diameter of 0.5 mm to 5 mm, particularly preferably 1 mm to 3 mm, and/or a length of 5 mm to 500 mm, preferably 10 mm to 100 mm.

In a preferred embodiment, the pin has a diameter to length aspect ratio from 1:3 to 1:100, preferably 1:5 to 1:20.

In a preferred embodiment, the pin has a central bore, wherein a wall thickness of the pin with central bore is preferably between 0.2 mm and 5 mm, particularly preferably between 0.5 mm and 2 mm. In said embodiment, the force conductor preferably has the shape of a hollow cylinder, wherein the bore is present along the central axis and the wall thickness preferably corresponds to the difference between the outer radius (of the pin) and the inner radius (of the bore).

The provision of a bore in a pin as a force conductor entails particularly characteristic deformations of the base plate, such that the forces or torques acting on the force conductor can be measured particularly precisely.

For the purposes of the invention, a base plate preferably means a substantially planar component having a front and a rear side, wherein a maximum extension of the front or rear side (length, width) is large compared to the thickness of the base plate. For example, the maximum extension of the front or rear side of a base plate may correspond to a diameter in the case of a circular shape. Preferably, the thickness of the base plate can be smaller by a factor of 5, 10, 20 or more than a maximum extension of the front or rear side (e.g. of a diameter or an edge length of the front or rear side).

The shape of the front or rear side of the base plate can be variously characterized and can be, for example, a circle, a rectangle, a trapezoid, a triangle, an ellipse without being limited to these examples.

Within the meaning of the invention, the positioning of the sensor chip underneath the force conductor preferably means that the sensor chip is positioned on the rear side of the base plate in a localized area which is located opposite the force conductor or the fixing point. Preferably, the sensor chip thus overlaps at least partially with a projection of the front-side fixing point of the force conductor. In preferred embodiments, the force conductor and sensor chip can be axially aligned with each other.

In preferred embodiments, the base plate may be formed by a substantially homogeneous planar body. Likewise, it may be preferred that the base plate is not a homogeneous body, but may have interruptions, for example in the form of slots, openings or other topologies. The base plate may also be formed, for example, by a lattice structure that deforms in a characteristic (measurable) manner when a load is exerted on the force conductor. The term 'base structure' can therefore preferably be used synonymously with the term base plate.

In a preferred embodiment, the base plate has a thickness between 0.1 mm and 2 mm, preferably between 0.3 mm and 0.7 mm.

In a preferred embodiment, the base plate and/or the force conductor is formed from a metal preferably selected from the group consisting of iron, steel, stainless steel, spring steel, brass, copper, titanium, aluminum, lead, magnesium, beryllium copper and/or other alloys of the foregoing.

In further preferred embodiments, the base plate and/or the force conductor can be provided not only from metals but also from other materials of microsystems technology, such as semiconductors, ceramics or plastics.

Ceramic materials in particular are characterized by high resistance to high-temperature applications or harsh environmental conditions, especially for the provision of base plates and/or force conductors. For example, the apparatus is also suitable for media separation due to the attachment of the sensor chip on the rear side of the base plate. Thus, for application in a flow sensor, the force conductor can be located in a flowing fluid (liquid or gas), while the sensor chip is installed on the opposite side of the base plate.

In a preferred embodiment, the base plate and/or force conductor may be formed from a substrate, preferably selected from the group consisting of monocrystalline silicon, polysilicon, silicon dioxide, silicon carbide, silicon germanium, silicon nitride, nitride, germanium, carbon, gallium arsenide, gallium nitride, indium phosphide, and glass.

These materials are easy and inexpensive to process in semiconductor and/or microsystem manufacturing and are suitable for large-scale production. In addition, this allows the possibility to provide the apparatus comprising spring body and sensor chip preferably in an integrated (semiconductor) process. This simplifies production such that a particularly compact multi-axis force sensor can be provided at low cost.

The aforementioned dimensioning and materials of the force conductor and base plate have proven to be advantageous in providing a particularly sensitive measuring apparatus.

In a preferred embodiment, the base plate and/or the force conductor has a relief groove, preferably in the form of a border around the area on which the force conductor is affixed to the base plate. A relief groove designates in particular a recess, cavity or notch which is present in the form of a border on the base plate and/or the force conductor.

Particularly advantageous in this respect is the provision of a central bore within the pin and/or a relief groove, preferably in the form of a border around the area on which the force conductor is affixed to the base plate.

Both features, independently of each other, but particularly distinctly in combination, lead to characteristic deformations of the base plate in the fixing area, which allow particularly sensitive measurements of multiaxial loads on the force conductor.

In preferred embodiments, the spring body can be monolithic. That is, the force conductor, preferably a pin, and the base plate are formed from one block of material. However, the spring body can also be formed as a composite body, in which case the force conductor, preferably a pin, is fixed to the base plate.

Within the meaning of the invention, a sensor chip preferably means a semiconductor component comprising at least one substrate with one or more sensor elements and preferably an electronic circuit.

In a preferred embodiment, the one or more sensor elements are configured for resistive, preferably piezoresistive, optical, magnetic, inductive, and/or capacitive measurement of deformations, stresses, forces, and/or torques of the substrate.

Resistive and piezoresistive sensor elements are usually based on a change in electrical resistance due to a change in length of the substrate on which they are mounted. The piezoresistive change in resistance due to a strain on the sensor elements is significantly stronger (k-factor), especially in the case of (doped) semiconductors, and preferably allows more sensitive and accurate strain measurements. A change in resistance can preferably be measured by a change in the stress applied to the sensor element in a Wheatstone bridge.

Piezoelectric sensor elements are preferably based on the generation of an electrical voltage inherent to the material by means of compressive and/or tensile forces acting on the arrangement.

An inductive measurement arrangement is preferably based on the strength of the current induced by a varying magnetic field.

An optical sensor element can preferably measure strain between different areas via a distance measurement (e.g. interferometric measurement) in which the superimposition of coherent optical signals provides information that can be read out regarding their phase difference. This phase difference in turn preferably contains information about the distance between the areas.

A magnetic sensor element can, for example, be based on a Hall sensor which generates a different voltage depending on the position within a magnetic field and thus depending on the experienced magnetic flux density. Thus, preferably with a fixed reference magnetic field, the measured voltage can be used to detect the relative position of the Hall sensor to this magnetic field. This measurement principle can be used in particular to realize a distance measurement (and thus stress or strain measurement) between different areas on the substrate.

A capacitive sensor element is preferably based on the principle of a measurable change in the capacitance of a capacitor with a variation in the distance between the capacitor plates (electrodes). A variety of different implementations are conceivable, for example in the form of capacitor plates on the substrate, as (MEMS) comb structures, in which the comb coverage and/or the comb spacing can be varied depending on the embodiment.

A person skilled in the art knows various sensor elements as well as materials which can preferably be used to enable resistive, preferably piezoresistive, optical, magnetic, inductive and/or capacitive measurement of deformations, stresses, forces and/or torques.

Preferably MEMS sensors are used, i.e. a component based on MEMS technology. MEMS stands for the English term microelectromechanical system, i.e. a microsystem, whereby a compact design (in the range of micrometers) is achieved with simultaneously excellent functionality with ever lower manufacturing costs. In particular, the entire sensor chip comprising the sensor elements and the electronics is preferably fully integrated into CMOS technology.

Preferably, the sensor elements are arranged on a substrate together with an electronic circuit for evaluating and/or controlling the sensor elements and are in contact with this circuit via electrical connections, which are made, for example, by wire bonding and/or are laid out in the substrate, e.g. by conductor tracks. The substrate functions in particular as a mechanical carrier, but can also realize electrical functions, e.g. providing electrical connections for the individual components.

Preferred electronic circuits comprise, but are not limited to, an integrated circuit (IC), an application-specific integrated circuit (ASIC), a programmable logic device (PLD), a field programmable gate array (FPGA), a microprocessor, a microcomputer, a programmable logic controller, and/or other electronic, preferably programmable, circuitry.

By means of an electronic circuit and/or further electronic components on the sensor chip, it is preferably already possible to read out and/or (pre-)process the measured data of the sensor elements. For this purpose, a multiplexer (MUX, for reading out the signals of multiple sensor elements), an operational amplifier (e.g. differential difference amplifier (DDA) with variable gain) or analog-to-digital converter (ADC) can be present on the sensor chip or a circuit carrier for converting the signals into digital data.

In a particularly preferred embodiment, the one or more sensor elements comprise piezoresistive structures, preferably piezoresistive sensor bridges.

Preferably, the piezoresistive sensor bridges can be designed as Wheatstone bridges, preferably as full bridges. Advantageously, four piezoresistive structures forming the full bridge can be positioned very close to each other. Sources of interference such as temperature drift are compensated for, since the temperature drift preferably affects all piezoresistive structures equally.

Particularly preferably, the sensor chip comprises more than 3, 5, 10, 15, 20 or more sensor elements, wherein the sensor elements are distributed at various positions on the substrate.

Due to the large number of sensor elements, a particularly precise measurement of a two-dimensional distribution of deformations, stresses, forces and/or torques on the substrate can be carried out. Unlike semiconductor strain gauge sensors, for example, the sensor chip does not integrate the local load on the substrate over its entire surface, but enables a spatially resolved measurement of the stress or strain in the relevant area below the base surface by means of the large number of sensor elements on the substrate.

In a preferred embodiment, one or more of the sensing elements is used to measure differential stress $\sigma_{xx}-\sigma_{yy}$—on the substrate. The stresses $\sigma_{xx}$ and $\sigma_{yy}$ correspond to orthogonal normal stresses in the xy-plane.

In a preferred embodiment, one or more sensor elements measure a shear stress $\sigma_{xy}$ so that shear forces acting on the substrate can also be detected.

In a preferred embodiment, the sensor elements are designed as piezoresistive sensor bridges, which are arranged in a square as Wheatstone bridges, whereby a shear stress is detected by n-channel-based transistors and whereby the sensor bridge is rotated by 45° to an (x,y) coordinate system, while p-channel-based transistors are arranged as a sensor bridge parallel to the coordinate system and measure the normal differential stress.

Particularly preferably, the piezoresistive sensor bridges are designed as square field-effect transistors (FET, preferably MOSFET) with four source/drain contacts (piezo FETs) that exploit the piezoresistive shear effect in n-type (NMOS) or p-type (PMOS) inversion layers. Preferably, NMOS sensor elements are used for measuring the shear stress $\sigma_{xy}$ and PMOS sensor elements are used for measuring the normal differential stress ($\sigma_{xx}-\sigma_{yy}$). Examples of preferred sensor chips with piezoresistive sensor bridges as sensor elements are disclosed in Gieschke et al. 2009 and Kuhl et al. 2013, among others. Advantageously, particularly compact sensor elements can be realized with dimensions of 10 μm×10 μm or smaller.

Particularly preferably, there can be multiple sensor elements on the sensor which detect a differential stress of the normal stresses $\sigma_{xx}-\sigma_{yy}$ as well as multiple sensor elements which detect a shear stress $\sigma_{xy}$. This provides a particularly precise image of a two-dimensional stress distribution in the substrate and thus indirectly of the area of the base plate on which the force conductor is fixed.

In a preferred embodiment, the substrate of the sensor chip comprises a semiconductor material, preferably silicon, monocrystalline silicon, polysilicon, silicon dioxide, silicon carbide, silicon germanium, silicon nitride, nitride, germanium, carbon, gallium arsenide, gallium nitride and/or indium phosphide. These materials are easy and inexpensive to process in semiconductor and/or microsystem production and are also well suited for bulk production. Likewise, these materials are particularly suitable for doping and/or coating to achieve the desired electrical, mechanical thermal and/or optical properties in specific areas.

The sensor elements for measuring a mechanical deformation and/or stress acting on the sensor chip are integrated onto or into the substrate. Materials and/or production techniques known from the semiconductor industry can be used here, which are characterized by their efficiency, simplicity, low production costs and suitability for the production of large quantities.

For example, masking (preferably photolithography) on the substrate can be used to define areas for forming the sensor elements and/or an electronic circuit, on which further semiconductor processes such as etching, doping and/or deposition can be carried out. The substrate can also be a multilayer substrate comprising two or more layers which are individually processed and joined together (bonding).

An etching and/or patterning can preferably be selected from the group comprising dry etching, wet chemical etching and/or plasma etching, in particular reactive ion etching, deep reactive ion etching (Bosch process).

An application or deposition can preferably be selected from the group comprising physical vapor deposition (PVD), in particular thermal evaporation, laser beam evaporation, arc evaporation, molecular beam epitaxy, sputtering, chemical vapor deposition (CVD) and/or atomic layer deposition (ALD).

Doping can be performed, for example, by known processes such as alloying, diffusion, and/or ion implantation.

In a preferred embodiment, the substrate of the sensor chip has a thickness between 100 µm and 600 µm, preferably 200 µm and 400 µm. The dimensioning of the substrate is particularly suitable for ensuring a good transfer function between deformations from stresses or deformations of the area of the base plate and the sensor elements.

Preferably, the sensor chip is attached to the rear of the base plate on one side of the substrate. For this purpose, for example, an adhesive can be used which creates a direct connection between the substrate and the base plate.

In addition to the connection by means of an adhesive, a variety of techniques from integrated circuit packaging technology (ICP) can be used for a mechanical coupling of the sensor chip to the base plate. These include without limitation the use of an adhesive film, soldering, brazing (welding), reactive joining (preferably with thermally reactive films, in particular nanometer multilayers or reactive multilayer systems RMS joining) or also bonding, for example anodic bonding, direct bonding, bonding processes with intermediate layers (e.g. eutectic bonding), glass frit bonding, adhesive bonding and/or selective bonding.

Mechanical deformations are preferably transferred directly to the thin-film substrate via mechanical coupling using ICP technology (for example, adhesive bonding, soldering, reactive joining, bonding, etc.), with the sensor elements on the opposite side of the substrate picking up a two-dimensional stress or deformation image.

The sensor elements are therefore preferably used to detect deformations or stresses of the sensor chip itself or of the substrate. Due to the mechanical coupling with the force conductor, the measured data provide direct conclusions about stresses, forces, deformations or torques that act on the force conductor or on the object in which the force conductor is integrated.

By means of various calibrations, it is possible to obtain not only relative information about the changes in the mechanical loads in the force conductor or object, but also absolute information about the stresses, forces, deformations or torques acting in the component. For example, mechanical properties of the sensor chip or the substrate as well as of the force conductor can be included in the calibration.

Due to the finite thickness of the substrate, the two-dimensional stress or deformation image produced by the sensor elements on the free side of the substrate may differ from the actual stress or deformation distribution on the base plate. However, the differences are constant for a given sensor chip and substrate, so these are included in a calibration.

In another preferred embodiment, the apparatus comprises one or more inductive interfaces, preferably coils, for a transmission of measured values and/or for the supply of energy.

Such a telemetric interface allows a particularly flexible use of an energy-autonomous apparatus.

Via the inductive interface, the electrical power required for operation can be coupled in by an external reader. The integrated sensor elements can then measure the stress or deformation distribution and then transmit the measured data wirelessly to the reader. For data transmission by means of the telemetric interface, it may also be preferable, for example, to use NFC (near field communication) standard.

Advantageously, the apparatus can also be used, for example, to monitor rotating objects, such as tool spindles, which is otherwise not easily possible by means of cable-based contacting.

The inductive interface or (transponder) coils can be installed on the sensor chip itself, or separately, for example on a printed circuit board.

In a preferred embodiment, the sensor chip is in contact with a circuit carrier. A circuit carrier is preferably a component comprising an electrically insulating material on which electrically conductive connections (conductor tracks) and/or electronic components or assemblies are present.

In preferred embodiments, the circuit carrier is a printed circuit board, whereby both conventional (rigid) printed circuit boards and flexible printed circuits can be used.

In a preferred embodiment, the sensor chip can also be in contact with a circuit carrier by means of a chip-on-board method, with electrical contact preferably being made by means of a flip-chip assembly or chip-and-wire technique, preferably by means of wire bonding.

In chip-and-wire technology, the sensor chip is preferably bonded directly to the circuit carrier (e.g. a printed circuit board) and electrically connected to the circuit carrier by means of wire bonding (bridges made of fine wire).

Preferably, for example, the sensor chip can be attached to the rear of the base plate by means of ICP technology (for example, adhesive bonding, soldering, reactive joining, etc.) and connected via an electrical connection, for example a wire bond, to a printed circuit board that is also attached to the base plate. Alternatively, a flip-chip assembly can also preferably be used, in which case the sensor chip is preferably attached to the circuit carrier (e.g. printed circuit board) with an active contacting side on which the sensor technology (sensor elements) and/or electronics are located. The contacting is preferably carried out by means of contacting bumps, for example by means of an anisotropic conductive film. In flip-chip assembly, too, it is preferred to attach the sensor chip directly to the base surface by means of an adhesive for the best possible force transfer with the substrate, with the printed circuit board on the accessible side facing away from the base plate.

Contact can be established between the sensor chip and an external data processing unit in a wired or wireless manner, preferably via an interface on the circuit carrier.

Contact can be established between the sensor chip and an external data processing unit in a wired or wireless manner, preferably via an interface on the circuit carrier (e.g. a printed circuit board).

Different shapes may be preferred for the sensor chip, for example a circular shape, rectangular shape or other polygonal shape, the shape of a rectangle, especially a square, is particularly preferred.

In a preferred embodiment, the sensor chip has a width and/or length between 0.5 mm and 10 mm, preferably 1 mm and 5 mm, preferably 1 mm to 3 mm. The thickness of the sensor chip is preferably less than 1 mm, preferably less than 700 μm, or less than 500 μm.

Thus, in the preferred embodiment, the sensor chip is substantially flat, i.e., the sensor chip is characterized by a greater width and/or length in one plane (xy-plane) compared to a dimension orthogonal thereto (z-axis, thickness). The factor may be, for example, 2, 3, 5 or more.

In a preferred embodiment, the sensor chip has an area from 0.25 mm² to 100 mm², preferably 1 mm² to 25 mm², more preferably 1 mm² to 9 mm².

In another aspect, the invention preferably relates to a system comprising.

a) a described apparatus and b) a data processing unit wherein the data processing unit is configured for reading out measured data detected by the sensor chip.

The average person skilled in the art will recognize that technical features, definitions and advantages of preferred embodiments disclosed for the apparatus according to the invention apply equally to the system comprising such apparatus, and vice versa.

Preferably, the data processing unit is configured to detect the forces and/or torques acting on the force conductor by means of the measured data relating to deformations, stresses, forces and/or torques of the substrate detected by the sensor chip.

The data processing unit thus preferably permits evaluation of the measured data from the sensor chip in order to detect the actual loads on the force conductor or an object connected to it.

The electronic circuit on the sensor chip itself can also already perform a (pre-)evaluation of the measured data. However, it may also be preferred that the electronic circuit essentially forwards the measured data unprocessed to the (external) data processing unit for further processing and/or evaluation.

The (external) data processing unit is preferably a unit which is suitable and configured for receiving, transmitting, storing and/or processing data, preferably measured data. The data processing unit preferably comprises an integrated circuit, a processor, a processor chip, microprocessor or microcontroller for processing data, as well as a data memory, for example a hard disk, a random access memory (RAM), a read-only memory (ROM) or also a flash memory for storing the data.

In order to detect the forces and/or torques acting on the force conductor on the basis of the measured data related to deformations, stresses, forces and/or torques of the substrate detected by the sensor chip, a computer program can preferably be stored on the data memory, which comprises commands to perform corresponding calculation steps. Preferably, reference data obtained by suitable calibration can also be available on the data processing unit for this purpose.

Particularly preferably, the data processing unit is a personal computer (PC), a laptop, a tablet or the like, which, in addition to comprising means for receiving, transmitting, storing and/or processing data, also comprise a display of the data as well as an input means, such as a keyboard, a mouse, a touch screen, etc. In addition, the data processing unit can preferably also be used to control the apparatus, i.e., for example, to preset parameters for performing the measurements.

DETAILED DESCRIPTION

In the following, the invention will be explained in more detail by means of examples, without being limited to them.

FIG. 1 shows a schematic illustration of a preferred embodiment of a spring body 1 according to the invention.

The spring body 1 comprises a force conductor 3, which has the shape of a pin and mechanically couples into a base plate 5 in a fixing area. Without the application of force, the force conductor 3 is substantially perpendicular to the base plate 5. Forces or torques acting on the force conductor 3 cause deflections or deformations which are directly transmitted to the fixing area of the base plate 3.

FIG. 1A shows a top view of the spring body 1 such that the front side of the base plate 5 is visible. FIG. 1 B illustrates the rear side of the base plate 5.

FIG. 1A illustrates a deflection of the force conductor 3 in a spatial direction. As can be seen in FIG. 1B, such a deflection results in a characteristic deformation of the rear side of the base plate 5 below the pin 3. Red areas indicate extension, while blue areas indicate compression. The arrangement or alignment of the areas of compression and extension allow a highly precise resolution of the direction of the deflection of the force conductor 3. The amplitude of the deformation or stress in the base plate 5 also correlates very precisely with the amplitude of the deflection of the force conductor 3.

The illustrated spring body 1 thus allows the forces and/or torques acting on the force conductor 3 to be concentrated in a localized area of the base plate 5, such that a sensor chip (not shown in FIG. 1) on the rear side below said area allows conclusions to be drawn about the forces and/or torques acting on the force conductor 3 on the basis of a measurement of deformations, stresses, forces and/or torques of its substrate connected to said area of the base plate 5.

For this purpose, the shape of a round pin 3, which is substantially perpendicular to the base plate 5 without any forces, has proved advantageous. Particularly good results can also be achieved if the pin 3 has a central bore 6 and there is a relief groove 7 in the form of a border is present in the base plate 5 and/or the force conductor 3.

FIGS. 2 and 3 illustrate the measurement of the resulting stresses or deformations in the area of the base plate 5 underneath the force conductor 3.

As illustrated in FIGS. 2A and B, the sensor chip 2 or its substrate experiences an analogous deformation or stress distribution due to its direct coupling to the base plate 5, which can be recorded on the sensor chip 2 by means of the sensor elements (not shown).

FIGS. 3A and 3B show, respectively, the two-dimensional distribution of normal stresses Sx (or $\sigma_{xx}$) and Sy (or $\sigma_{yy}$).

The sensor chip 2 or the sensor elements installed thereon preferably detect the difference of the normal stresses $S_x–S_y$ (or $\sigma_{xx}–\sigma_{yy}$)

Figure 1:
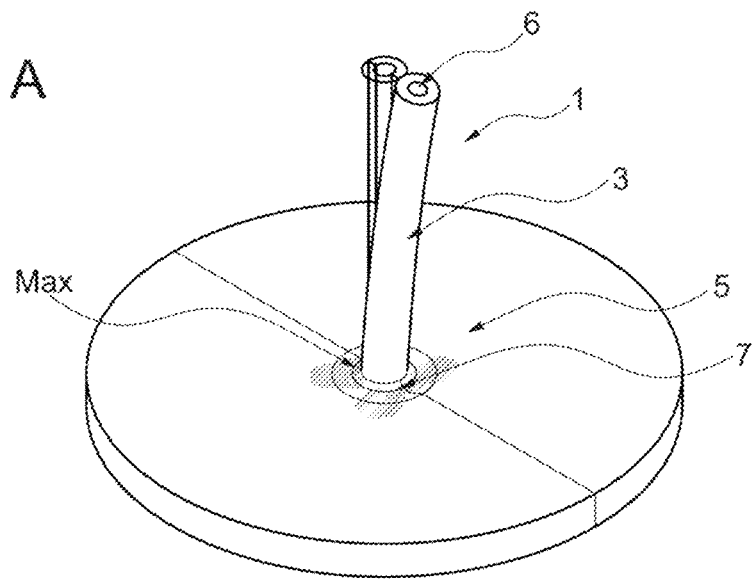
Figure 1:
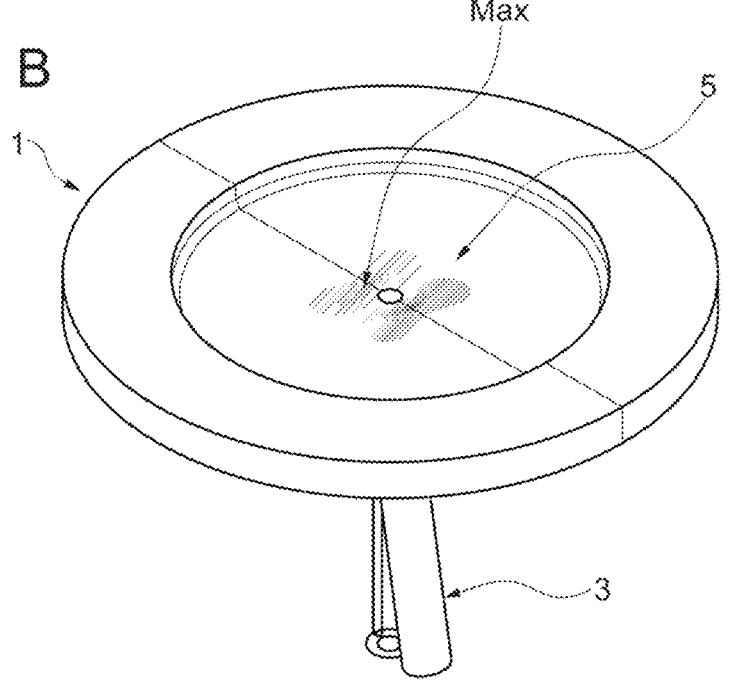
Figure 2:
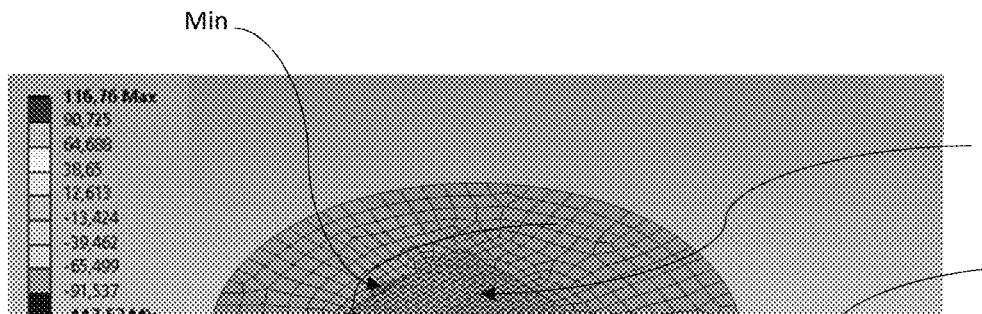
Figure 2:
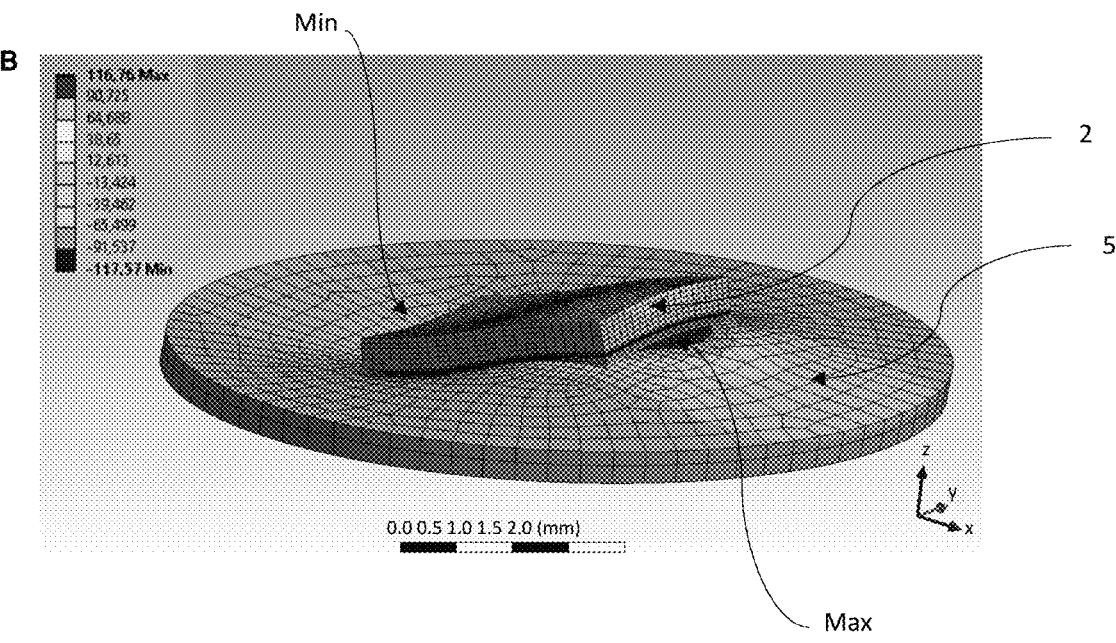
Figure 3:
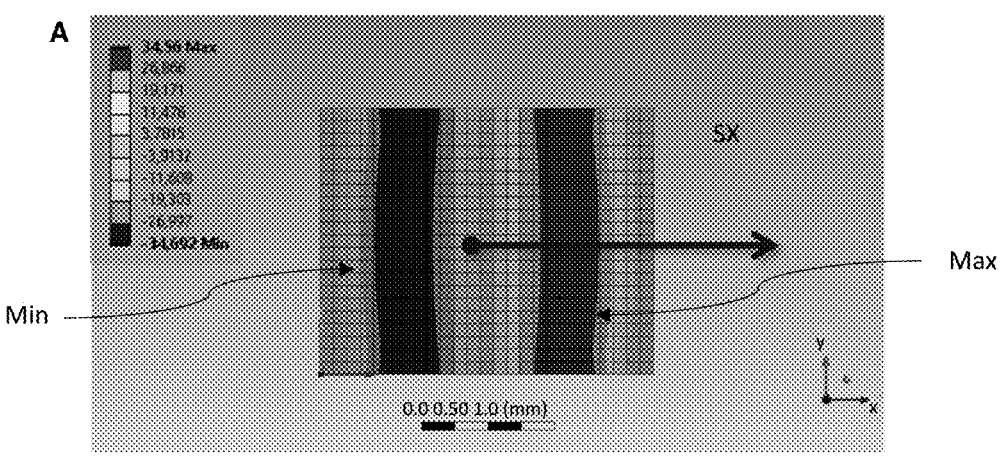
FIG. 3 illustrates a two-dimensional stress distribution at the base plate 5 resulting from a deflection of the force conductor 3 as shown in FIG. 1.
Figure 3:
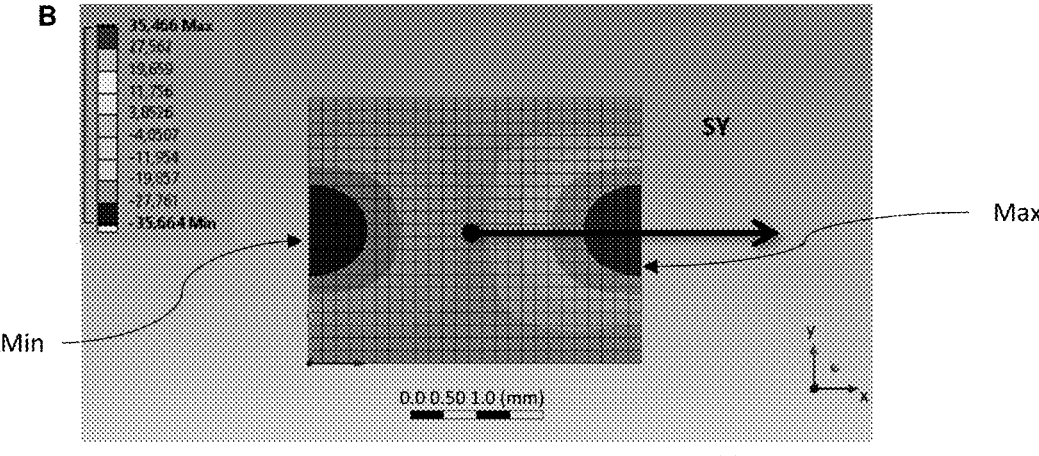
Figure 3:
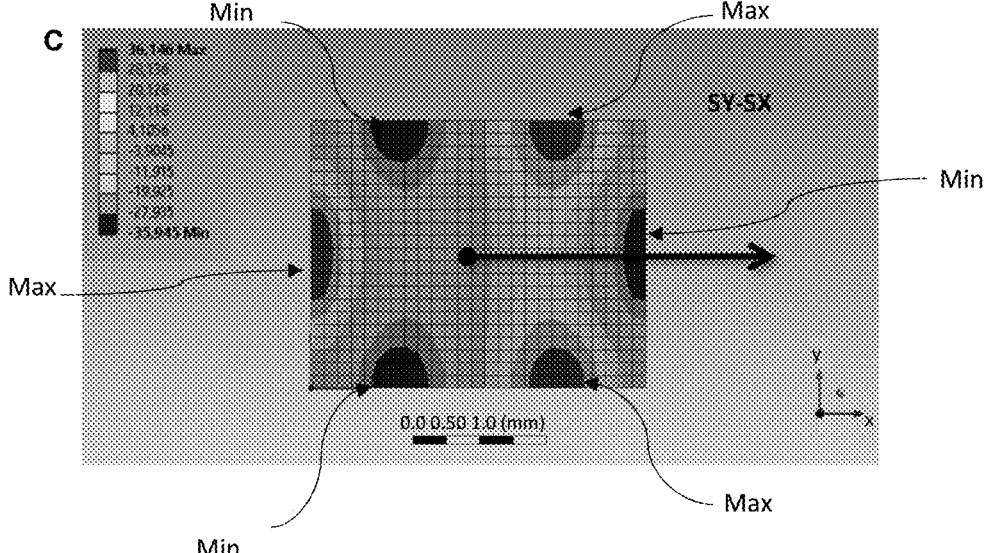

The difference can be seen in FIG. 3 C. Advantageously, the stress distribution is characterized by a series of characteristic peaks which allow a highly precise measurement of the deflection of the force conductor 3.

Figure 4:
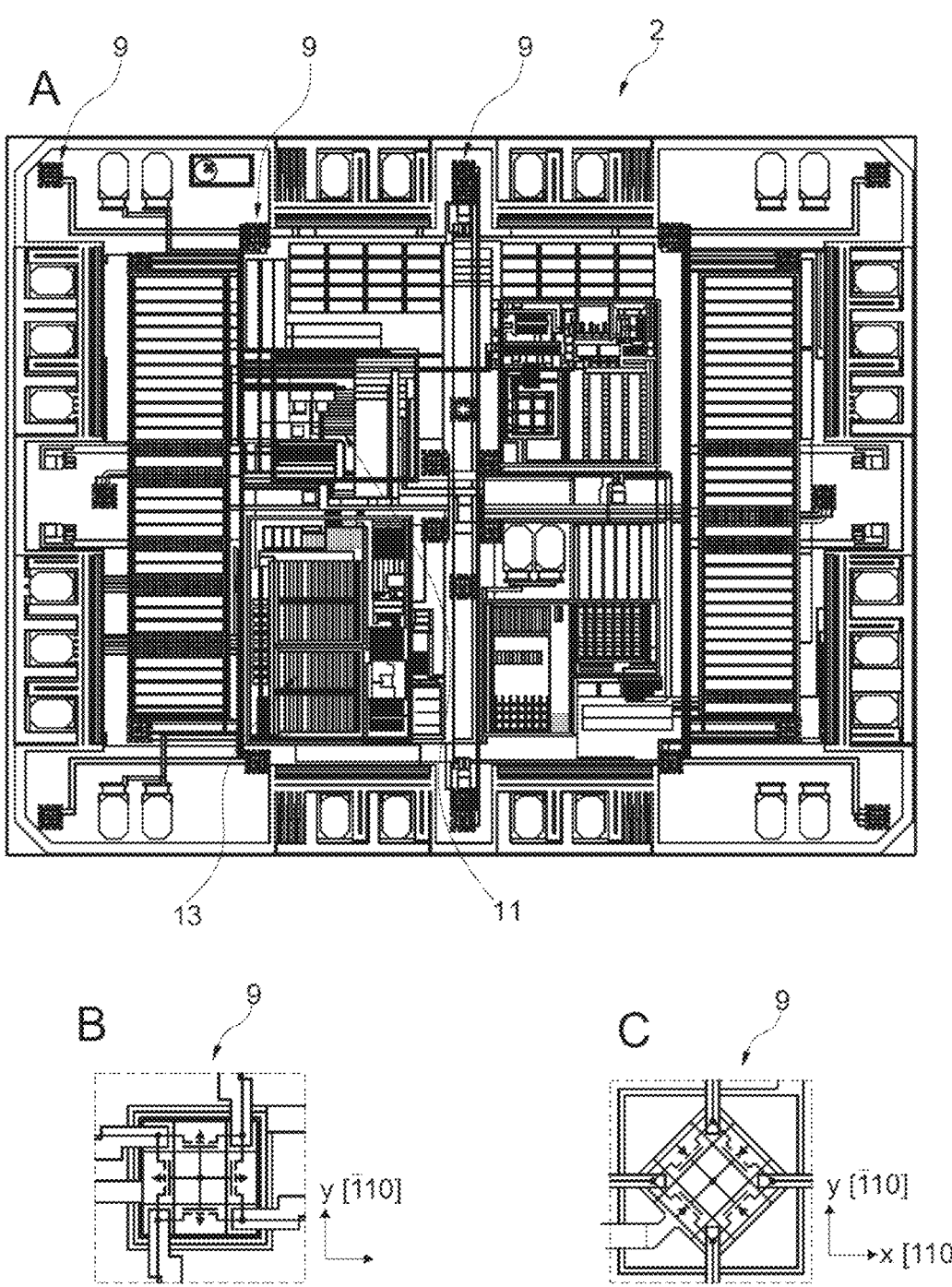

FIG. 4 illustrates a preferred embodiment of a sensor chip 2, showing the sensor technology or electronics located on the substrate.

The sensor chip 2 comprises a total of 32 sensor elements 9, which are positioned at different positions on the substrate to ensure a two-dimensional resolution of the stress distribution. The sensor chip 2 itself has a length and width of approx. 2 mm×2.5 mm and a thickness of approx. 300 μm.

The sensor chip 2 is fully integrated in CMOS technology. The sensor elements 9 are piezoresistive sensor bridges which are preferably Wheatstone bridges (see FIGS. 4 B and C).

FIG. 4B illustrates a sensor element 9 which is a piezoresistive sensor bridge of the PMOS type and is aligned parallel to the coordinate system (x,y) and is sensitive in particular to the difference in normal stresses $\sigma_{xx}-\sigma_{yy}$.

FIG. 4 C shows a sensor element 9, which is a piezoresistive sensor bridge of the NMOS type and is oriented at 45° to the coordinate system (x,y) and is sensitive in particular to shear stress $\sigma_{xy}$.

In addition to the sensor elements 9, the sensor chip has additional electronic components. In particular, the sensor chip 2 comprises a control logic as electronic circuit 11 or an analog-to-digital converter (ADC) and an operational amplifier (differential difference amplifier (DDA)). In the preferred embodiment, there is also an inductive interface (telemetric interface) for wireless readout of measured data or for power supply.

Figure 5:
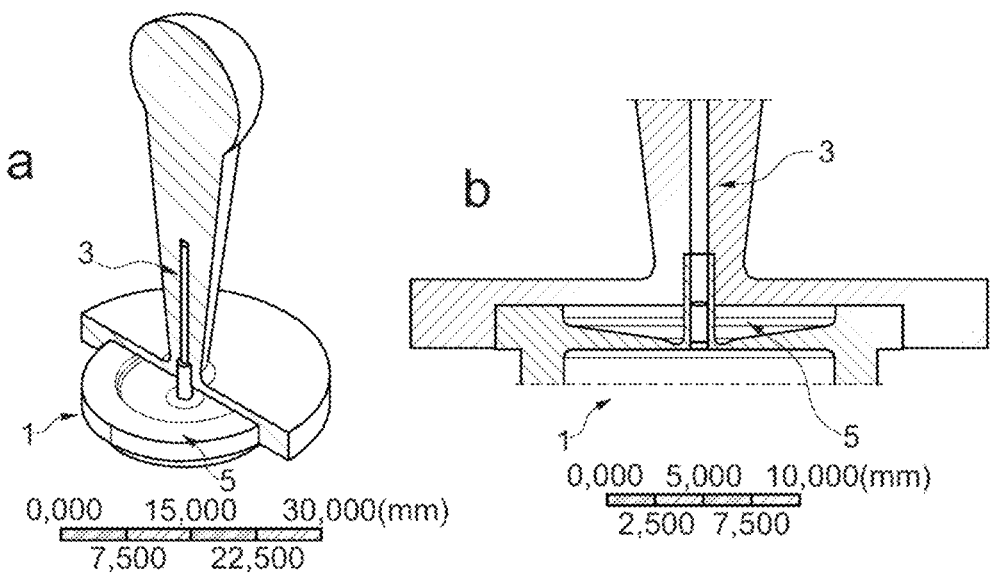
Figure 5:
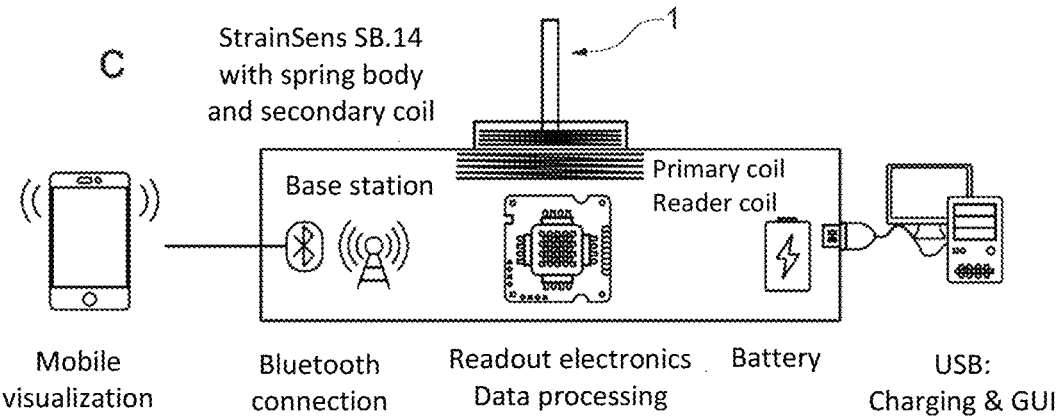

One example application of a preferred apparatus is illustrated in FIG. 5. Here, the apparatus with the force conductor 3 is present within a joystick. A movement of the joystick leads to a deflection of the force conductor 3, which can be detected on the basis of a measurement of the stress or deformation distribution by the sensor chip (not illustrated).

To supply power to the sensor chip and to read out the measured data, the apparatus comprises an inductive interface in the form of a secondary coil. The electrical power required for operation can be coupled in by an external base unit or reader, which comprises a primary coil for this purpose. Thereupon, the integrated sensor elements can measure the voltage or deformation distribution and in turn transmit measured data wirelessly to the base unit or reader.

The base unit or reader can already perform a (pre) evaluation of the data by means of an electronic reading process as a data processing unit. Preferably, the measured data is also transferred to another external data processing unit, for example a PC, notebook or mobile device, for evaluation, visualization and/or storage.

LIST OF REFERENCE SIGNS

1 Spring body
2 Sensor chip
3 Force conductor, preferably pin
5 Base plate
6 Central bore
7 Relief groove
9 Sensor elements
11 Electronic circuit, for example ASIC
13 Inductive interface

BIBLIOGRAPHY

Gieschke P., Y. Nurcahyo, M. Herrmann, M. Kuhl, P. Ruther and O. Paul, "CMOS Integrated Stress Mapping Chips with 32 N-Type or P-Type Piezoresistive Field Effect Transistors," 2009 *IEEE 22nd International Conference on Micro Electro Mechanical Systems*, Sorrento, Italy, 2009, pp. 769-772, doi: 10.1109/MEM-SYS.2009.4805496.

Jaeger Richard. C., Suhling, Jeffrey C., Ramani, Ramanathan, Bradley, Arthur T. and Xu, Jianping, *CMOS Stress Sensors on* (100) *Silicon*, IEEE JOURNAL OF SOLID-STATE CIRCUITS, VOL. 35, NO. 1, January 2000.

Kuhl M., Gieschke, P., Rossbach, D., Hilzensauer, S., Panchaphongsaphak, T., Ruther, P., Lapatki, B., Paul, O., Manoli, Yi, "A Wireless Stress Mapping System for Orthodontic Brackets Using CMOS Integrated Sensors," in *IEEE Journal of Solid-State Circuits*, vol. 48, no. 9, pp. 2191-2202, September 2013, doi: 10.1109/JSSC.2013.2264619.

The invention claimed is:

1. An apparatus for measuring multi-axis loads on an object comprising:
   a spring body, and
   a sensor chip comprising one or more sensor elements configured to measure deformations, stresses, forces and/or torques and an electronic circuit on a substrate, wherein the spring body comprises a base plate on the front side of which a force conductor is installed, wherein the sensor chip is positioned on and attached to the rear side of the base plate below the force conductor,
   wherein the spring body is configured such that forces and/or torques acting on the force conductor are concentrated in a localized area of the base plate to which the substrate of the sensor chip is connected and which translate into deformations or stresses of said substrate of the sensor chip and wherein the one or more sensor elements are configured to measure the deformations or stresses of the substrate of the sensor chip to allow for conclusions to be drawn about forces and/or torques acting on the force conductor.

2. The apparatus according to claim 1, wherein the force conductor is formed by a pin which is substantially perpendicular to the base plate when no force is exerted upon it.

3. The apparatus according to claim 2, wherein the pin has a diameter from 0.5 mm to 5 mm, a length from 5 mm to 500 mm, and/or an aspect ratio of diameter to length from 1:3 to 1:100.

4. The apparatus according to claim 2, wherein the pin has a central bore.

5. The apparatus according to claim 1, wherein the base plate has a thickness between 0.1 mm and 2 mm.

6. The apparatus according to claim 1, wherein the base plate and/or the force conductor has a relief groove, in the form of a border around the area where the force conductor comes into contact with the base plate.

7. The apparatus according to claim 1, wherein the base plate and/or the force conductor are formed from a metal.

8. The apparatus according to claim 1 wherein the one or more sensor elements are configured for a resistive, optical, magnetic, inductive and/or capacitive measurement of deformations, stresses, forces and/or torques of the substrate.

9. The apparatus according to claim 1 wherein the one or more sensor elements comprise piezoresistive structures, and/or the sensor chip has more than 5 sensor elements, the sensor elements having different sensitivities for a measurement of deformations, stresses, forces and/or torques of the substrate.

10. The apparatus according to claim 1 wherein the sensor chip is configured to measure deformations, stresses, forces and/or torques in multiple axes and/or to measure a two-dimensional distribution of deformations, stresses, forces and/or torques of the substrate.

11. The apparatus according to claim 1 wherein the substrate of the sensor chip comprises a semiconductor material.

12. The apparatus according to claim 1 wherein the substrate of the sensor chip has a thickness between 100 μm and 600 μm.

13. A system comprising:

a) an apparatus according to claim 1, and b) a data processing unit, wherein the data processing unit is configured for reading out the measured data detected by the sensor chip.

14. A system according to claim 1 wherein the data processing unit is configured to detect the forces and/or torques acting on the force conductor from the measured data related to deformations, stresses, forces and/or torques of the substrate detected by the sensor chip.

15. The apparatus according to claim 7, wherein the metal is selected from the group consisting of iron, steel, stainless steel, spring steel, brass, copper, titanium, aluminum, lead, magnesium, beryllium copper and an alloy of the aforementioned.

16. The apparatus according to claim 1 wherein the one or more sensor elements are configured for a piezoresistive measurement of deformations, stresses, forces and/or torques of the substrate.

17. The apparatus according to claim 9 wherein the one or more sensor elements comprise piezoresistive sensor bridges.

18. The apparatus according to claim 11, wherein the semiconductor material is selected from the group consisting of silicon, monocrystalline silicon, polysilicon, silicon dioxide, silicon carbide, silicon germanium, silicon nitride, nitride, germanium, carbon, gallium arsenide, gallium nitride and indium phosphide.

\* \* \* \* \*